United States Patent
Lee et al.

(10) Patent No.: US 7,302,662 B2
(45) Date of Patent: Nov. 27, 2007

(54) METHOD FOR POST-ROUTING REDUNDANT VIA INSERTION IN INTEGRATED CIRCUIT LAYOUT

(75) Inventors: Kuang-Yao Lee, Kaohsiung (TW); Ting-Chi Wang, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 0 days.

(21) Appl. No.: 11/391,628

(22) Filed: Mar. 28, 2006

(65) Prior Publication Data

US 2007/0234258 A1   Oct. 4, 2007

(51) Int. Cl.
*G06F 17/50* (2006.01)

(52) U.S. Cl. ............................................. 716/9; 716/10

(58) Field of Classification Search ............... 716/9–11
See application file for complete search history.

(56) References Cited

U.S. PATENT DOCUMENTS

| | | | | |
|---|---|---|---|---|
| 6,026,224 A * | 2/2000 | Darden et al. | ................. | 716/10 |
| 6,556,658 B2 * | 4/2003 | Brennan | ......................... | 379/9 |
| 6,711,721 B2 * | 3/2004 | Brennan | ......................... | 716/2 |
| 6,715,133 B2 * | 3/2004 | Brennan | ......................... | 716/2 |
| 6,735,753 B2 * | 5/2004 | Miyakawa | .................... | 716/11 |
| 6,804,808 B2 * | 10/2004 | Li et al. | ......................... | 716/5 |
| 7,007,258 B2 * | 2/2006 | Li | ................................. | 716/9 |
| 7,131,095 B2 * | 10/2006 | Zhang et al. | ................. | 716/12 |
| 2005/0048677 A1 * | 3/2005 | Allen et al. | ..................... | 438/5 |
| 2006/0064653 A1 * | 3/2006 | Zhang et al. | .................. | 716/2 |
| 2006/0064654 A1 * | 3/2006 | Zhang et al. | .................. | 716/2 |
| 2006/0101355 A1 * | 5/2006 | Ciplickas et al. | ............. | 716/2 |
| 2006/0101367 A1 * | 5/2006 | Fujita et al. | .................. | 716/10 |
| 2006/0143587 A1 * | 6/2006 | Boutin et al. | ................. | 716/18 |
| 2006/0225005 A1 * | 10/2006 | Correale et al. | ............. | 716/2 |
| 2006/0265684 A1 * | 11/2006 | Buehler et al. | ............... | 716/12 |
| 2006/0294488 A1 * | 12/2006 | Waller | ......................... | 716/13 |

* cited by examiner

*Primary Examiner*—Jack Chiang
*Assistant Examiner*—Patrick Sandoval
(74) *Attorney, Agent, or Firm*—Egbert Law Offices

(57) ABSTRACT

The objective of the invention is to provide a method for post-routing redundant via insertion. The method is to construct a conflict graph from a post-routing design first, to find a maximal independent set (MIS) of the conflict graph, and to replace a single via with a double via for each vertex in the maximal independent set. Furthermore, since redundant vias can be classified into on-track and off-track ones and since on-track ones have better electrical properties, the invention also presents two methods to increase the amount of on-track redundant vias while a redundant via insertion solution is given.

15 Claims, 7 Drawing Sheets

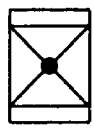
FIG. 1(a)
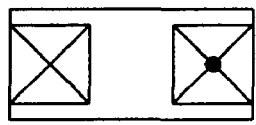
FIG. 1(b)
FIG. 1(c)
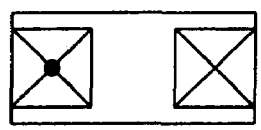
FIG. 1(d)
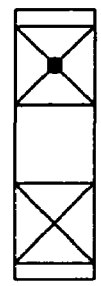
FIG. 1(e)

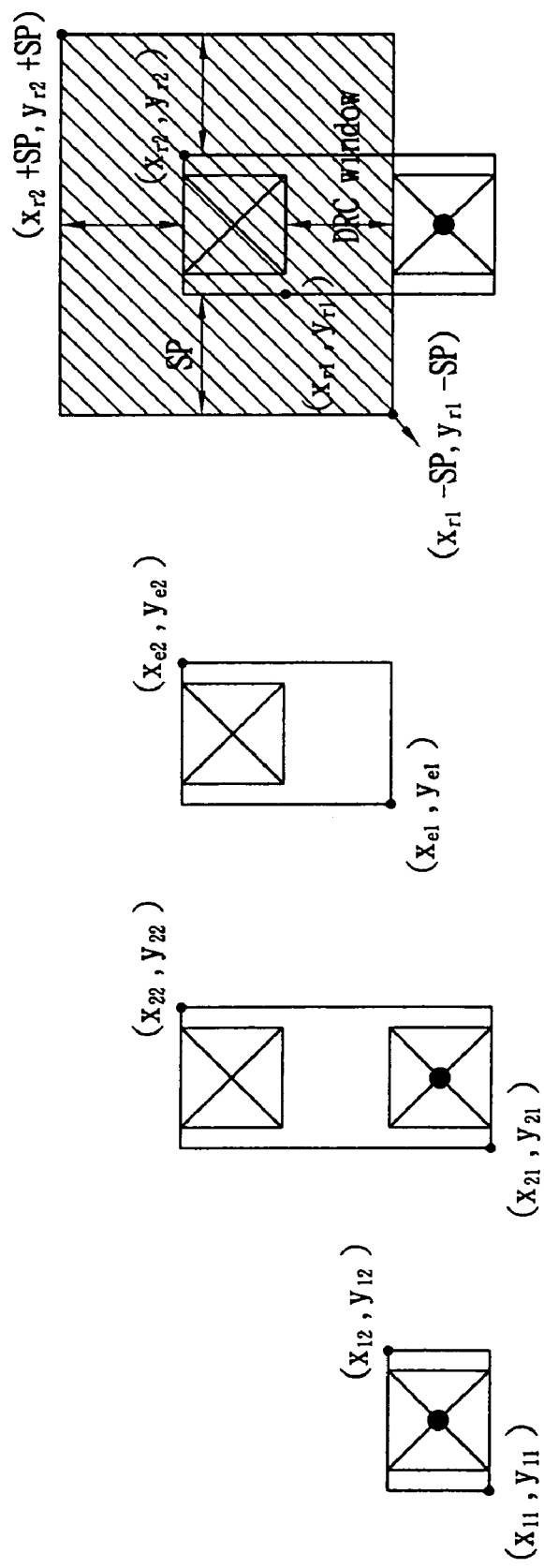

METHOD FOR POST-ROUTING REDUNDANT VIA INSERTION IN INTEGRATED CIRCUIT LAYOUT

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to a method for redundant via insertion in an integrated circuit (IC) layout, and more particularly, to a method for post-routing redundant via insertion in IC layout.

BACKGROUND OF THE INVENTION

With the advent of the very deep submicron (VDSM) technologies, the process variations become more and more serious, and thus achieving high yield rates on semiconductor chips will be more difficult. In order to reduce the burden of manufacturers to maintain the manufacturability and high yield rates, a new design methodology, design for manufacturability (DFM), is suggested. This design methodology proposes that in order to improve the manufacturability and yield of a design, the manufacturability issues could be considered during the physical design stage.

In an IC layout, a via provides a connection between two net segments from adjacent metal layers. Due to the growing of the design scale and/or the jumper-based solution to avoid the antenna effect, the number of vias could become very large. However, due to various reasons such as cut misalignment in a manufacturing process, electromigration and thermal stress, a via may fail partially or completely. For a partially failed via, the contact resistance and the parasitic capacitance will increase and may induce timing problems. On the other hand, a complete via failure will leave an open net on the circuit. These may heavily impact on the functionality and yield of a design. Therefore, reducing the yield loss due to via failure is important in DFM.

A well known and highly recommended method to improve via yield is to add a redundant via adjacent to a single via, enabling a single via failure to be tolerated and also reducing the via resistance. Therefore, redundant vias do not hurt timing performance, and the reliability of a design can be improved.

BRIEF SUMMARY OF THE INVENTION

The objective of the present invention is to provide a method for post-routing redundant via insertion in IC layout. The method is to construct a conflict graph from a routed design first, then to find a maximal independent set (MIS) of the conflict graph, and finally to replace a single via with a double via for each vertex in the MIS.

A first embodiment of the present invention is to provide a method for constructing a conflict graph by constructing the vertex and edge sets simultaneously. First, the R-trees for each metal layer are constructed and all single vias are sorted by one of their coordinates in the non-decreasing order, then a dynamic vertex comparison set (VCS), which initially is empty, is created. Then, according to the sorted order of vias, the following four steps are performed for each single via to get the conflict graph: (1) elements of the VCS is deleted if their locations are too far from the single via under processing; (2) double vias of the single via under processing are selected by doing design rule check (DRC) between the double vias and the established R-trees of adjacent metal layers, wherein if there is no DRC violation, then the double via is deemed a feasible double via and a new corresponding vertex is added to the conflict graph; (3) DRCs are performed between the new feasible double vias generated in step (2) and elements of the VCS, and if there are any DRC violation between a new feasible double via and an element of the VCS, an edge will be added to the conflict graph between their corresponding vertices; and (4) the extended bounding boxes of the new feasible double vias are added to the VCS as new elements, and an edge is added to the conflict graph between each pair of the vertices generated in step (2).

After completing the construction of the conflict graph, a second embodiment of the present invention is to present a heuristic method that solves the MIS problem on a conflict graph. Time complexities of MIS solvers are usually growing very fast as the numbers of vertices and edges in the graph increase. Therefore, the MIS heuristic method will solve the MIS problem in an iterative manner. In each iteration, a subgraph of size k (which specifies the maximal number of vertices in the subgraph and is a user-specified constant) is extracted from the conflict graph according to a priority queue comprising at least one key, a maximal independent set solution to the subgraph is sought and added to the previous solutions, and then the conflict graph and the priority queue are updated. The MIS heuristic method will terminate when the conflict graph has no remaining vertices, then a solution of MIS is found.

A third embodiment of the present invention is to present a post processing heuristic (PPH) method. Given a redundant via insertion solution, the PPH method will increase the amount of on-track double vias as many as possible while at the same time without decreasing the total number of inserted double vias. The PPH method works as follows. It takes a conflict graph and a redundant via insertion solution MIS as inputs. Each vertex of the MIS will be processed by the following three steps in a random order: (1) a vertex v of the MIS is sought if the vertex is not an on-track double via; (2) each edge-connected vertex v' of v in the conflict graph will be checked to find a replacement vertex in the conflict graph, and a replacement vertex v' is sought if the edge-connected vertex v' is an on-track double via and each edge-connected vertex of the v' is not in the MIS; and (3) the vertex v is deleted from the MIS and the vertex v' is added to the MIS if at least one replacement vertex v' is sought.

The method of the present invention is to construct the vertex and edge sets simultaneously, thereby saving a significant amount of time in constructing a conflict graph. In addition, the present provides an effective heuristic method to find a MIS of the conflict graph. Moreover, the present provides an effective PPH method to increase the amount of on-track double vias while a redundant via insertion solution is given.

BRIEF DESCRIPTION OF THE SEVERAL VIEWS OF THE DRAWINGS

The objectives and advantages of the present invention will become apparent upon reading the following description and referring to the accompanying drawings.

FIG. 1(a) shows a schematic view of a drawings of a single via.

FIGS. 1(b), 1(c), 1(d), 1(e) show schematic views of drawings of double vias which are on upper, down, left, and right sides of a single via, respectively.

FIG. 2(a) shows a schematic view of a bounding box of a single via.

FIG. 2(b) shows a schematic view of a bounding box of a double via.

FIG. 2(c) shows a schematic view of an extended bounding box of a double via.

FIG. 2(d) shows a a schematic view of a design rule window of a double via.

DETAILED DESCRIPTION OF THE INVENTION

Figure 3B:
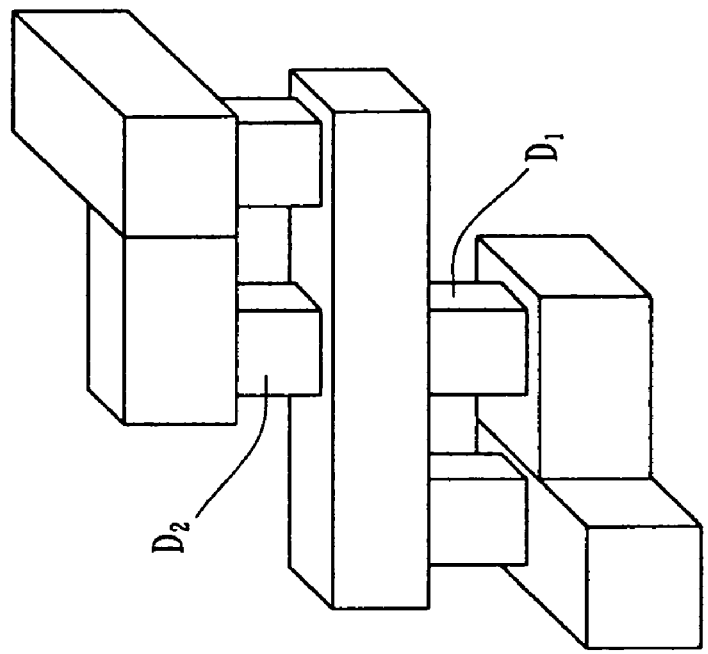
FIG. 3(a) and FIG. 3(b) show schematic views illustrating an exception example of adding an edge between two vertices.

A redundant via insertion process is to add a redundant via adjacent to a single via without violating any design rule. For simplicity, a single via and an inserted redundant via adjacent to it are named a double via. According to the position of a redundant via, a double via can be categorized into four types, a single via is illustrated in FIG. 1(a) and its position is defined at its center. FIGS. 1(b), 1(c), 1(d) and 1(e) are the illustrations of the four different double vias, which are on upper, down, left, and right sides of a single via, respectively. These types are named DVU, DVD, DVL and DVR, respectively. Given a single via i, its double via of type j (j∈{DVU, DVD, DVL,DVR}) is denoted by dv(i,j). For each single via, it has four choices to insert a redundant via if the insertions do not violate any design rule. A double via of a single via is said to be feasible if it does not violate any design rule, i.e., assuming none of the other single vias has a redundant via inserted in the area of the double via; otherwise the double via is defined as an infeasible one.

A conflict graph G (V,E) is defined as an undirected graph constructed from a post-routing solution, wherein the V is a vertex set on the graph G, the E is an edge set on the graph G. For each single via i on a signal net, if its double via of type j (dv(i,j)) is feasible, there is a vertex vi,j in V. An edge (vi,j, vi',j')∈E if and only if i=i', or dv(i,j) and dv(i',j') will cause design rule violations when both exist in the post-routing design. A maximal independent set MV of G is the maximal vertex set such that, $\forall$vi,j, vi',j' ∈ MV, (vi,j, vi',j') ∉E. A vertex of G represents a feasible double via, and if two vertices are the endpoints of an edge, the corresponding double vias in the post-routing design will violate design rules or they come from the same single via, and hence the maximal independent set of G is the maximal number of double vias that can be inserted into the post-routing design.

The construction of a conflict graph can be briefly divided into the vertex construction step and the edge construction step. For the vertex construction step, the feasible double vias of each single via have to be identified. First, under the consideration of time complexity, R-trees for each metal layer instead of a single R-tree for all metal layers are constructed. An R-tree and its variants are data structures used for indexing multi-dimensional information. In the invention, an R-tree for indexing 2-dimensional information is used. Typical queries on an R-tree specify a window of interest and retrieve all data intersecting or contained in the specified query window. For a metal layer, the corresponding R-tree consists of bounding boxes of each object such as a wire segment, pin, or obstacle on the layer; besides, the bounding box of the vias on adjacent via layers are also included in the R-tree.

As shown in FIG. 2(a), a bounding box of a single via i is Ri=[$x_{11}$, $x_{12}$]◻[$y_{11}$, $y_{12}$], wherein ($x_{11}$, $y_{11}$) and ($x_{12}$, $y_{12}$) are the coordinates of the lower left corner and the upper right corner of the bounding box, respectively. As shown in FIG. 2(b), a bounding box of a double via dv(i,j) is Rdv(i, j)=[$x_{21}$, $x_{22}$]◻[$y_{21}$, $y_{22}$]. As shown in FIG. 2(c), an extended bounding box of dv(i,j), denoted by DVE(i,j), is defined as Rdv(i,j)−Ri=[$x_{e1}$,$x_{e2}$]◻[$y_{e1}$,$y_{e2}$] for the illustration of DVE (i,DVU). As shown in FIG. 2(d), suppose the bounding box of the redundant via contained in dv(i, j) is Rrv=[$x_{r1}$, $x_{r2}$]◻[$y_{r1}$, $y_{r2}$]. A design rule window (DRW) of dv(i, j) is defined to be DRW(i, j)=[$x_{r1}$,−SP, $x_{r2}$+SP]◻[$y_{r1}$−SP, $y_{r2}$+SP], wherein SP is the spacing rule between two metals or cuts. A DRW set and a DVE set of a single via i, denoted by DRWSET(i) and DVESET(i), are defined by {DRW(i,j) | dv(i,j) is a feasible double via} and {DVE(i,j) | dv(i,j) is a feasible double via}, respectively.

Suppose the manufacturing technology used in the embodiments of the present invention consists of 2m+1 layers denoted by $ME_1$, $VIA_1$, $ME_2$, $VIA_2$, . . . , $ME_m$, $VIA_m$, $ME_{m+1}$, where for all i and j, 1≦i≦m+1 and 1≦j≦m, $ME_i$ and $VIA_j$ represent the ith metal layer and the jth via layer, respectively. A via on $VIA_i$ involves the layers $ME_i$, $VIA_i$, and $ME_{i+1}$, for which a set of design rules is given.

A first embodiment of the present invention is to provide a method for constructing a conflict graph by constructing the vertex and edge sets simultaneously. First, corresponding R-trees for each metal layer are constructed and all single vias are sorted by their x-coordinates in the non-decreasing order, then a dynamic vertex comparison set (VCS) is created. The VCS initially is empty and comprises elements, each element is an extended bounding box of feasible double via. And then according to the sorted order of vias (denoted 1, 2, . . . , n,), the following four steps (i.e., Step 1 through Step 4) are performed for each single via to get the conflict graph.

(Step 1) Suppose i is the single via being under consideration and $x_{11}$, is the x-coordinate of the lower left corner of the bounding box of DVL of i. If i is located in (x1, y1) and none of the x-coordinates of single vias 1, 2, . . . , i−1 is equal to x1, the elements of VCS contained in the range [−∞, $x_{11-SP}$]◻[−∞, +∞] are retrieved and deleted from VCS, since these elements will never overlap with any element of DRWSETO) with j≧i.

(Step 2) The vertex construction step for I is performed. For each double via dv(i, j) originating from a single via i on layer $VIA_k$, a DRW(i,j) is constructed and used as a query window to perform the range query on R-trees of $ME_k$ and $ME_{k+1}$. If there are any design rule check (DRC) violations between DRW(i,j) and any objects on R-trees of $ME_k$ and $ME_{k+1}$, single via i cannot be replaced with dv(i,j), because it will violate design rule. Hence, there will never be a vertex on the conflict graph for dv(i,j). On the other hand, if there is no object intersecting with DRW(i,j), a vertex vi,j is added to the conflict graph. The set of added vertices for the single via i is denoted by FV(i).

(Step 3) Each element of DRWSET(i) is used as the query window to do the range query on VCS. For each vertex $v_{ij} \in FV(i)$, a vertex set V' can be obtained, where for all $v_{i'j'}' \in V'$, the corresponding element in VCS, i.e., DVE(i', j'), intersects with DRW(i, j). However, an edge $(v_{ij}, v_{i'j'})$ cannot be added to the conflict graph directly, because vi,j, vi',j' may come from the same single via. Therefore, each pair $(v_{ij}, v_{i'j'})$ has to be checked to see if any design rule violation is induced.

(Step 4) Each element of DVESET(i) is inserted to VCS and an edge for each vertex pair of FV(i) is added to the conflict graph.

Figure 3A:
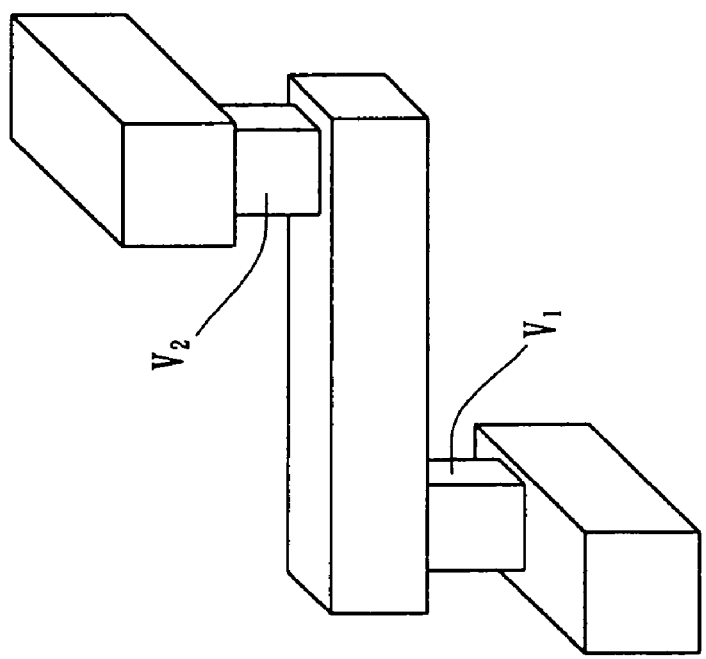

Note that in Step 3 each pair $(v_{ij}, v_{i'j'})$ needs to be checked to see if any design rule is violated, because there are cases where even if DVE(i', j') overlaps with DRW(i, j), inserting both double vias dv(i, j) and dv(i',j') into the design does not violate any design rule. A possible case is depicted in FIG. 3(a) and FIG. 3(b), wherein single via V1 and V2 belong to the same net, and DVE(V1, D1) overlaps with DRW(V2, D2). However, they do not violate any design rule because they belong to the same net.

If the edges of the conflict graph are constructed after the vertex construction step is completed, the time complexity will be proportional to n*n−1, where n is the number of vertices in the conflict graph. The method of the first embodiment is to construct the vertex and edge sets simultaneously, thereby saving a significant amount of time in constructing a conflict graph.

Figure 4A:
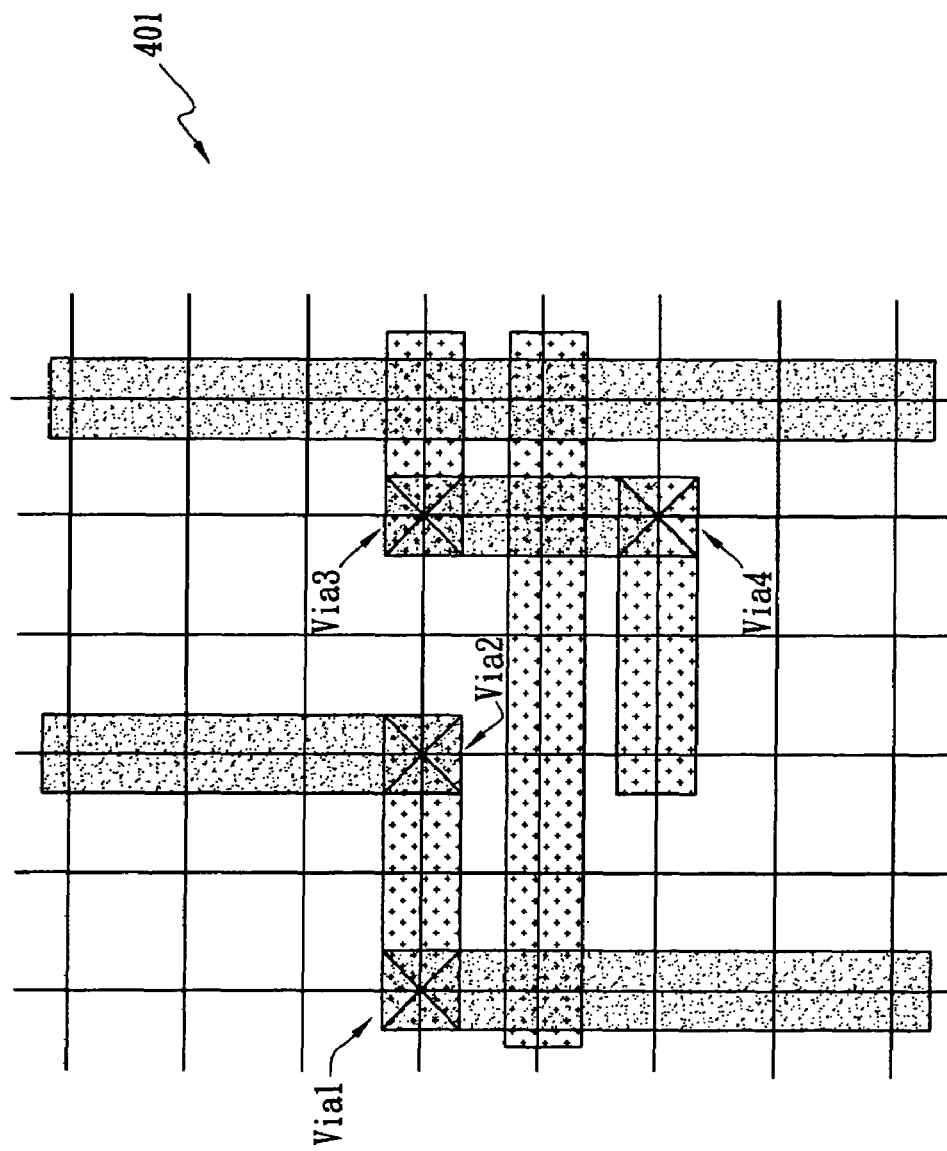
FIGS. 4(a) through 4(d) show schematic views illustrating an example of the method of the first embodiment.
Figures 4B, 4C, 4D:
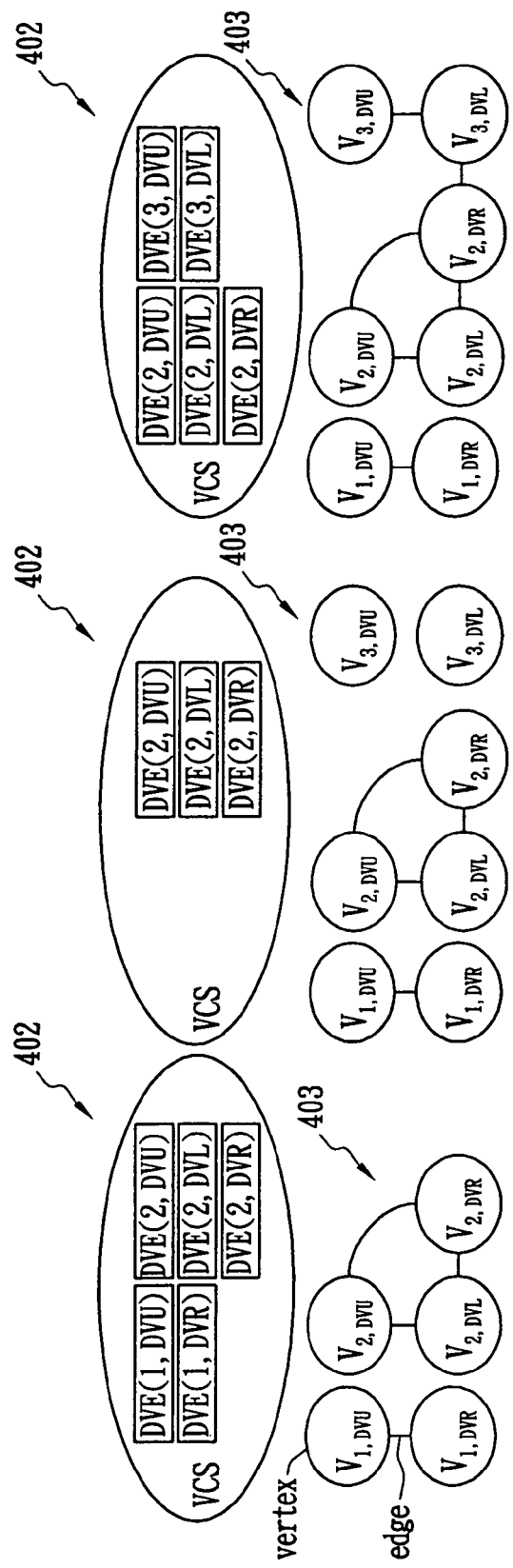

FIGS. 4(a) through 4(d) illustrate the first embodiment of the present invention. In FIG. 4(a), there are four single vias in a post-routing design 401, and they are numbered by 1, 2, 3 and 4 indicating the sorted sequence. After processing via 2, the elements of a VCS 402 and a conflict graph 403 are shown in FIG. 4(b). When processing via 3, after Step 1, DVE (1,DVU) and DVE (1,DVR) are deleted from the VCS 402 and the remaining elements in the VCS 402 are shown in FIG. 4(c). Then, after Step 2, the conflict graph 403 is updated as shown in FIG. 4(c). Finally, after Steps 3 and 4, the VCS 402 and the conflict graph 403 become those shown in FIG. 4(d). Afterwards, via 4 is processed similarly.

A second embodiment of the present invention is to present a heuristic method that solves a MIS problem on a conflict graph G (V,E), wherein the V is a vertex set on the graph G, the E is an edge set on the graph G. Before describing the details of the MIS heuristic method, the "feasible number" and "degree" are defined for each vertex. The feasible number is equal to the number of feasible double vias originating from the same single via. The degree of a vertex is equal to the number of edges between the vertex and the other vertices.

The detailed steps of the MIS heuristic method are given as follows.

(Step 1) For the conflict graph G (V,E), a priority queue Q of V is constructed by using the feasible number and degree of a vertex as a first key and a second key, respectively. A vertex is given a higher priority if it has smaller feasible number and degree. In addition, a vertex set Vsol is defined as the maximal independent set solution to G. Initially Vsol is an empty set.

(Step 2) The set Vsub={v1, v2,..., vk} of the first k vertices is extracted from Q, and the subgraph G'=(Vsub, E') is constructed, where $^{550}$vi, vj ∈ Vsub, (vi ,vj)∈E' if (vi, vj)∈E.

(Step 3) The MIS problem on G' is solved, and the solution thereof is denoted by Vtsol.

(Step 4) Vsol is set to be equal to Vsol∪Vtsol and then vertices in Vtsol and their edge-connected vertices are deleted from G and Q. Moreover, each edge incident to any deleted vertex is also removed from G. Finally, the feasible number and degree of each remaining vertex, which is originally edge-connected to some deleted vertex, are updated. In addition, Q is updated also.

(Step 5) If V is empty, the vertex set Vsol is the final solution; otherwise go back to Step 2.

The rationale behind subgraph extraction (i.e., Step 2) is that if a vertex with smaller feasible number and degree appears in the maximal independent set solution to G', less vertices will be deleted from the conflict graph in Step 4. Therefore, the MIS problem is preferably resolved on a subgraph containing vertices with smaller feasible numbers and degrees.

Figures 5A, 5B:
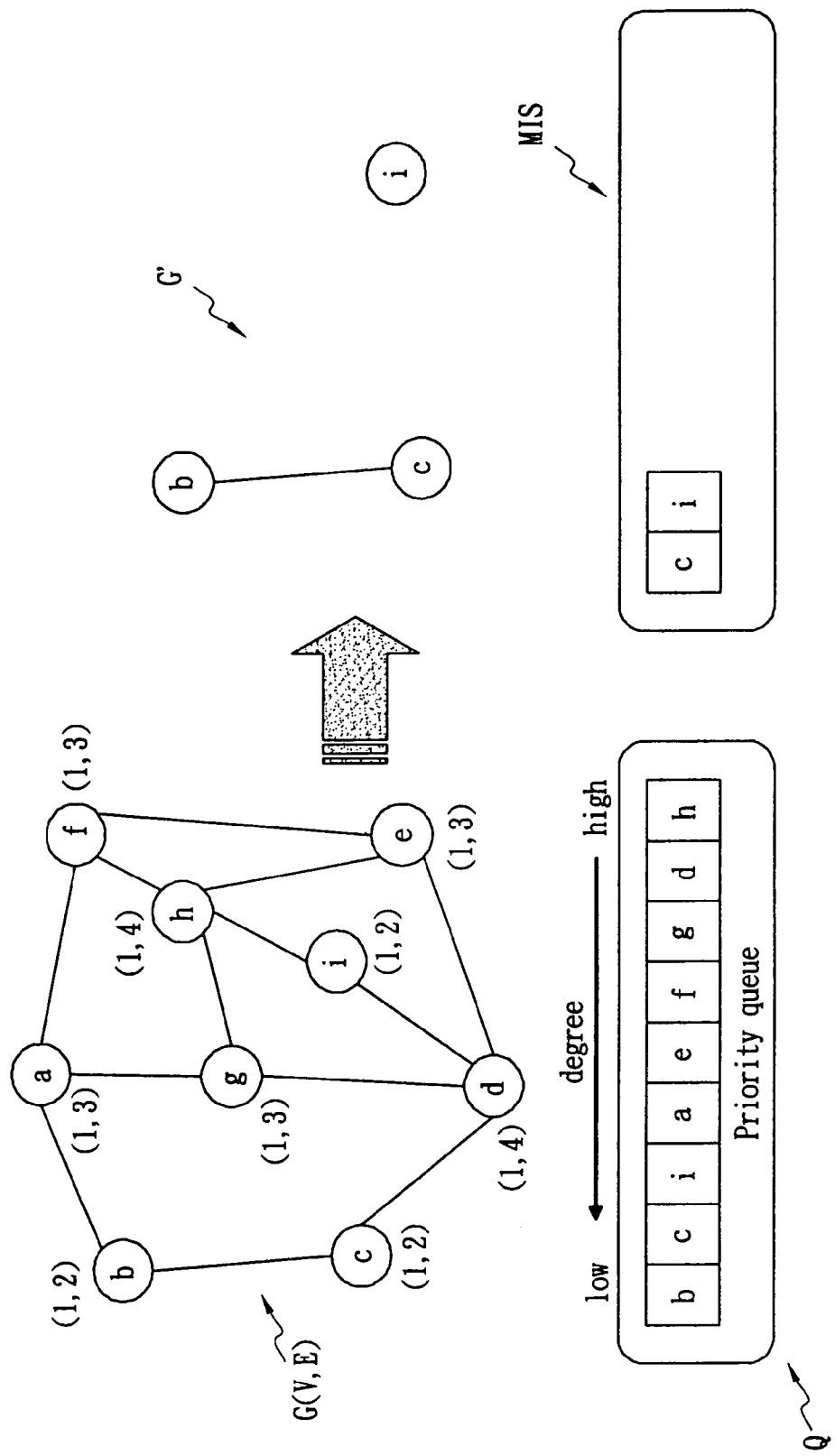
FIGS. 5(a) through 5(d) show schematic views illustrating an example of the method of the second embodiment.
Figures 5C, 5D:
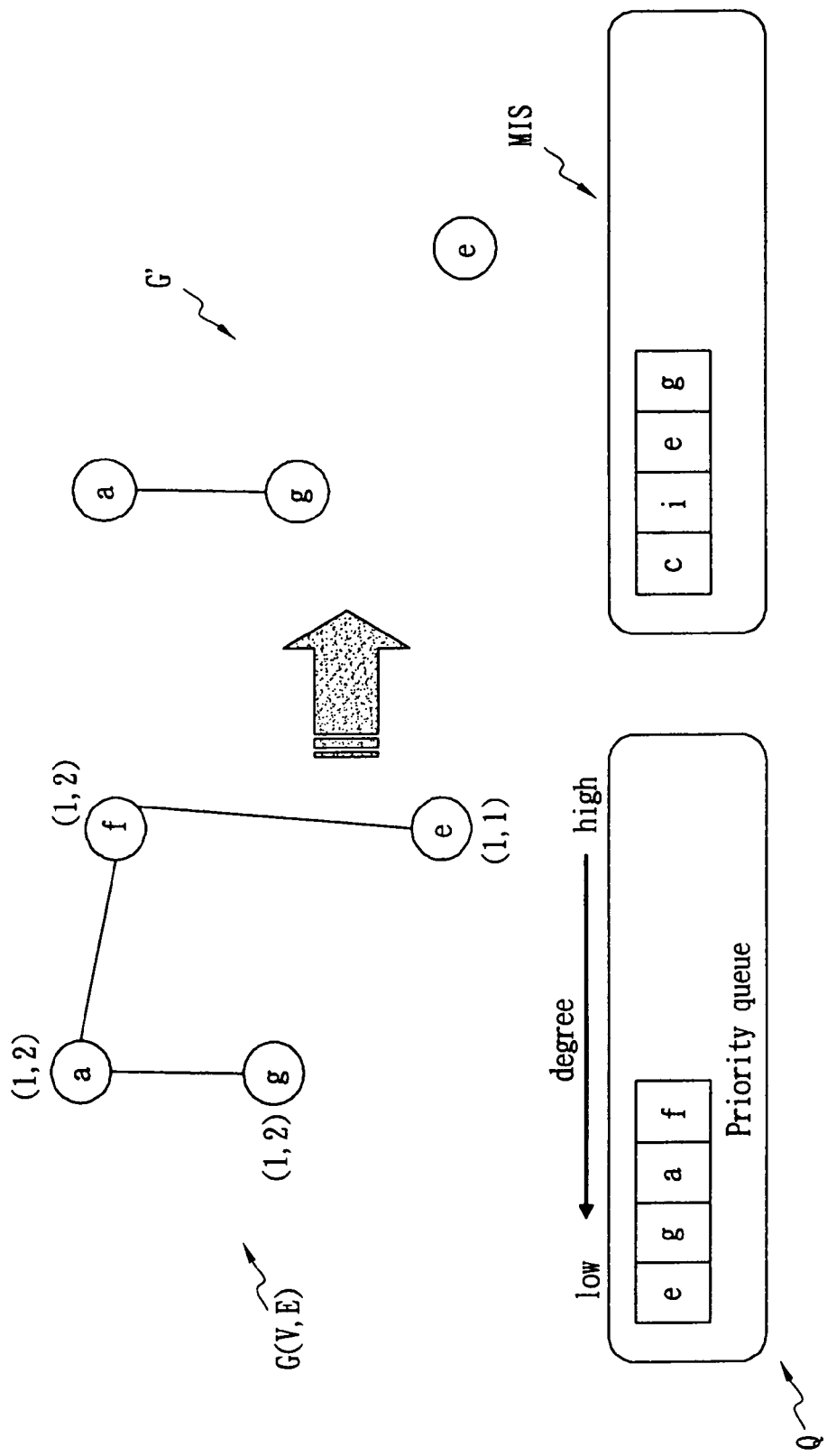

An example of the MIS heuristic method is illustrated, where each vertex is attached with a pair of numbers. the first number is a feasible number, and the second number is a degree. To simplify the example, assuming the feasible number of each vertex is equal to one. In the beginning, the conflict graph G and the priority queue Q are shown in FIG. 5(a). In Step 2, suppose k is set to 3, and the extracted subgraph G' has the vertex set {b, c, i} as shown in FIG. 5(b). Suppose the maximal independent set solution to G' obtained in Step 3 is {c, i}. Then in Step 4, G and Q are updated by deleting vertices c and i and their edge-connected vertices, each edge incident to any deleted vertex is also removed from G. The resultant G and Q are shown in FIG. 5(c). At the second iteration, G' will be the one shown in FIG. 5(d) and the maximal independent set solution to G' is assumed to be {g, e}. After Step 4 is done, G is empty, and hence the final solution obtained by the MIS heuristic method will be {c, e, i, g}.

A redundant via of a single via is called an on-track redundant via if the redundant via is inserted on a wire segment connecting to the single via. Otherwise, the redundant via is called an off-track redundant via. Since an on-track redundant via takes less routing resource and has better electrical properties than an off-track redundant via, on-track redundant vias are more preferable.

A double via is said to be on-track if its associated redundant via is an on-track redundant via; otherwise it is an off-track double via. Given a detailed routing solution, without re-routing any signal net, a problem asks to replace single vias on signal nets with double vias as many as possible, and the ratio of on-track double vias should be also as high as possible. In addition, two conditions should be satisfied. First, each single via either remains unchanged or is replaced by a double via. Second, after a double via is replaced, no design rule is violated. Two methods are used to solve the problem. The first one is to modify the MIS heuristic method by adding a third key to each vertex in the priority queue Q. If a vertex corresponds to an on-track double via, it will have a higher priority on the third key. With this modification, for vertices having the same feasible number and degree, on-track ones will be extracted first, and hence have higher chances to be included in the maximal independent set solution than off-track ones.

A third embodiment of the present invention is to present a post processing heuristic (PPH) method. Given a redundant via insertion solution, PPH will increase the amount of on-track double vias as many as possible while at the same time without decreasing the total number of double vias. PPH works as follows. It takes a conflict graph G (V,E) and a redundant via insertion solution MISorg as the input, and generates another vertex set MISmod as the output. Initially, MISmod is an empty set. In addition, a Boolean flag IS_DEL is used in PPH. MISorg is assumed to be a set of vertices, and we will interchangeably use vertices and double vias. Each vertex v of MISorg will be processed by the following four steps in a random order.

(Step 1) Set IS_DEL to FALSE.

(Step 2) If v is an on-track double via, go to Step 4, otherwise, go to Step 3.

(Step 3) Check each edge-connected vertex v' of v to find a replacement vertex in the conflict graph. If v' is an on-track double via and each edge-connected vertex of v' (excluding v) is not in MISorg∪MISmod, add v' to MISmod and set IS_DEL to TRUE.

(Step 4) If IS_DEL is FALSE, v will be moved from MISorg to MISmod. Otherwise, v will be deleted from MISorg.

As mentioned above, embodiments of the present invention is to construct a conflict graph from a post-routing design first, then find a maximal independent set of the conflict graph, and finally replace a single via with a double via for each vertex in the maximal independent set. Moreover, the present invention also presents two methods to increase the amount of on-track redundant vias while a redundant via insertion solution is given.

The above-described embodiments of the present invention are intended to be illustrative only. Numerous alternative embodiments may be devised by those skilled in the art without departing from the scope of the following claims.

We claim:

1. A method for post-routing via insertion comprising:

forming a conflict graph by simultaneously constructing edge and vertex sets from a post-routing design, wherein each vertex of a vertex set corresponds to a feasible double via such that if two vertices of the vertex set are endpoints of an edge, then either an existence of corresponding double vias violates design rules or corresponding two double vias come from a same single via, the step of forming comprising:

establishing a vertex comparison set by extending bounding boxes of feasible double vias in which said vertex comparison set is empty at a beginning;

sorting all single vias by x-coordinates thereof in non-decreasing order and according to a sorted order;

deleting each bounding box from the vertex comparison set if a distance between the bounding box and the single via exceeds a threshold value;

identifying feasible double vias for each single via;

adding vertices corresponding to the feasible double vias to said conflict graph;

adding an edge between a vertex corresponding to a feasible double via and a vertex corresponding to an element of said vertex comparison set that conflicts with the feasible double via;

adding a bounding box to the vertex comparison set for each feasible double via identified in the step of identifying feasible double vias;

adding an edge between each pair of the vertices corresponding to the feasible double vias identified in the step of identifying feasible double vias; and repeating the above steps until all single vias are processed in which the step of deleting each boundary box is skipped if a single via in verification is of a same coordinate as a single via that has been verified;

obtaining a maximal independent set solution of said conflict graph in which vertices in the maximal independent set have no edges between each pair of the vertices; and replacing the single vias with double vias corresponding to the vertices in the maximal independent set.

2. The method of claim 1, wherein the step of identifying feasible double vias comprises:

verifying whether an overlap exists between a design rule window of a double via and elements of an R-tree of adjacent two metal layers.

3. The method of claim 2, said R-tree being bounding boxes of a wire segment in the corresponding metal layer.

4. The method of claim 2, said R-tree being bounding boxes of a pin in the corresponding metal layer.

5. The method of claim 2, said R-tree being bounding boxes of an obstacle in the corresponding metal layer.

6. The method of claim 1, wherein the step of adding edges between the vertices comprising:

verifying whether an overlap violation exists between the feasible double via generated in the step of identifying feasible double vias and the remaining bounding boxes in the vertex comparison set.

7. The method of claim 1, further comprising:

skipping the step of adding the edges between the vertices if the feasible double via and the single vias corresponding to the remaining bounding boxes of the vertex comparison set are on the same net.

8. The method of claim 1, wherein the double vias extend from a single via in up, down, left and right directions.

9. The method of claim 1, wherein the step of obtaining the maximal independent set is empty at a beginning, the step of obtaining comprising:

extracting a subgraph from the conflict graph according to a priority queue;

obtaining a maximal independent set solution to the subgraph in which the vertices in the maximal independent set have no edges between each pair of the vertices;

adding a maximal independent set obtained by the step of obtaining the maximal independent set to a final solution;

deleting vertices of the maximal independent set and corresponding edge-connected vertices from the conflict graph and a priority queue;

removing edges connected to the deleted vertices from the conflict graph; and repeating the steps of extracting, of obtaining a maximal independent set, of adding the maximal independent set, of deleting vertices and of removing edges until the conflict graph has no remaining vertices.

10. The method of claim 9, wherein the priority queue is constructed in accordance with a feasible number, said feasible number being equal to a number of feasible double vias originating from a same single via, wherein a vertex with a smaller feasible number has a higher priority in the priority queue than a vertex with a higher feasible number.

11. The method of claim 10, the priority queue being constructed in accordance with a degree of a vertex in which the degree of a vertex is equal to a number of edges thereon and in which a vertex of a smaller degree number has a higher priority in the priority queue than a vertex of a higher degree number.

12. The method of claim 11, wherein a degree of a vertex is equal to a number of edges thereon in which a vertex with a smaller degree number has a higher priority in the priority queue than a vertex with a higher degree number and in which the feasible number has a higher priority in the priority queue than a priority of the degree.

13. The method of claim 10, wherein a vertex has a higher priority in the priority queue if the vertex corresponds to a double via in which the redundant via is inserted on a wire segment connected by a single via.

14. The method of claim 1, further comprising:
increasing an amount of an on-track double via inserted on a wire segment connected to single vias thereof without decreasing a total number of double vias while the maximal independent set is solved, the on-track double vias being double vias in which redundant via parts thereof are inserted on one of the wire segments connected by simple vias thereof.

15. The method of claim 14, wherein the step of increasing the amount of on-track double vias comprises:

seeking a vertex of the maximal independent set if the vertex is not an on-track double via;

checking each edge-connected vertex for the vertex sought above to find a replacement vertex in the conflict graph in which the replacement vertex is sought if the replacement vertex is an on-track double via and each edge-connected vertices of the replacement vertex is not in the maximal independent set;

deleting the vertex sought from the maximal independent set;

adding the replacement vertex sought to the maximal independent set if at least one replacement vertex is sought; and repeating the above steps until each vertex of the maximal independent set is processed.

* * * * *